US011898520B2

(12) United States Patent
Moussaoui et al.

(10) Patent No.: US 11,898,520 B2
(45) Date of Patent: Feb. 13, 2024

(54) GAS SUPPLY SYSTEM FOR HIGH- AND LOW-PRESSURE GAS-CONSUMING APPARATUSES AND METHOD OF CONTROLLING SUCH A SYSTEM

(71) Applicant: GAZTRANSPORT ET TECHNIGAZ, Saint Remy les Chevreuse (FR)

(72) Inventors: Selma Moussaoui, Saint Remy les Chevreuse (FR); Bernard Aoun, Saint Remy les Chevreuse (FR); Romain Narme, Saint Remy les Chevreuse (FR)

(73) Assignee: GAZTRANSPORT ET TECHNIGAZ, Saint Remy les Chevreuse (FR)

( * ) Notice: Subject to any disclaimer, the term of this patent is extended or adjusted under 35 U.S.C. 154(b) by 0 days.

(21) Appl. No.: 18/192,882

(22) Filed: Mar. 30, 2023

(65) Prior Publication Data

US 2023/0313766 A1 Oct. 5, 2023

(30) Foreign Application Priority Data

Mar. 31, 2022 (FR) ...................................... 22 02941

(51) Int. Cl.
*F02M 31/18* (2006.01)
*F02M 25/08* (2006.01)

(52) U.S. Cl.
CPC ........ *F02M 31/183* (2013.01); *F02M 25/089* (2013.01)

(58) Field of Classification Search
CPC ............ F02M 21/0221; F02M 21/023; F02M 21/0239; F02M 21/0245; F01M 2221/033; B63B 25/00; B63B 2025/087; B63B 27/24
See application file for complete search history.

(56) References Cited

U.S. PATENT DOCUMENTS

| | | | | | |
|---|---|---|---|---|---|
| 5,333,677 | A * | 8/1994 | Molivadas | F03G 6/003 123/41.26 |
| 11,193,703 | B1 * | 12/2021 | Heffner | F25B 41/20 |
| 2014/0144165 | A1 * | 5/2014 | Flynn | F25B 49/005 62/115 |
| 2016/0045841 | A1 * | 2/2016 | Kaplan | C01B 32/05 429/49 |
| 2016/0262419 | A1 * | 9/2016 | Cowans | A23G 9/22 |
| 2020/0361758 | A1 * | 11/2020 | Fantappié | B67D 1/0895 |
| 2020/0366180 | A1 * | 11/2020 | Mills | H01L 31/0735 |
| 2022/0316395 | A1 * | 10/2022 | Bak | F02C 7/141 |

* cited by examiner

*Primary Examiner* — John Kwon
(74) *Attorney, Agent, or Firm* — Oblon, McClelland, Maier & Neustadt, L.L.P.

(57) ABSTRACT

A system supplies gas to a high-pressure gas-consuming apparatus and a low-pressure gas-consuming apparatus of a floating structure including a tank. The supply system includes: a first supply circuit, a second supply circuit, a return line, a first heat exchanger and a second heat exchanger. The return line includes a flow-regulating member. The supply system includes a device for managing the supply system which includes a control module to control the flow-regulating member based on the characteristics of the gas.

13 Claims, 3 Drawing Sheets

[fig 1]
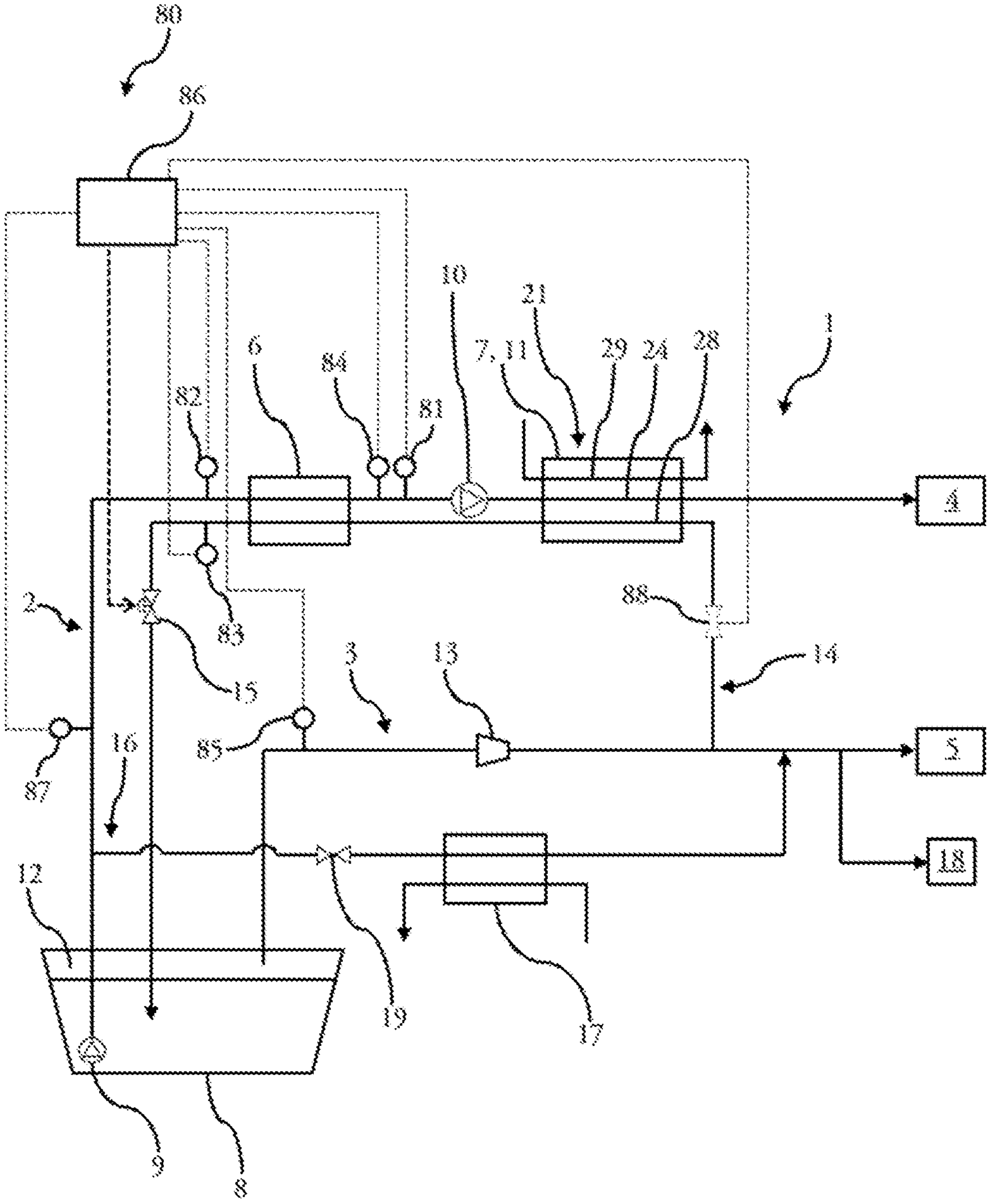

[fig 2]
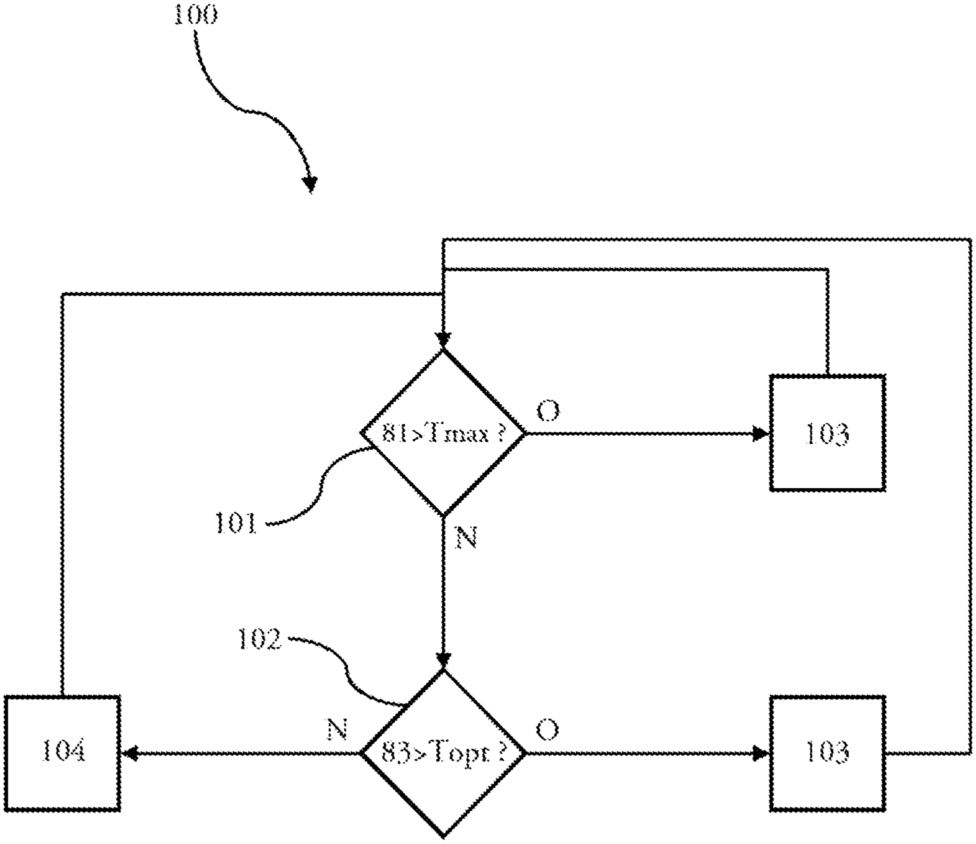
[fig 3]
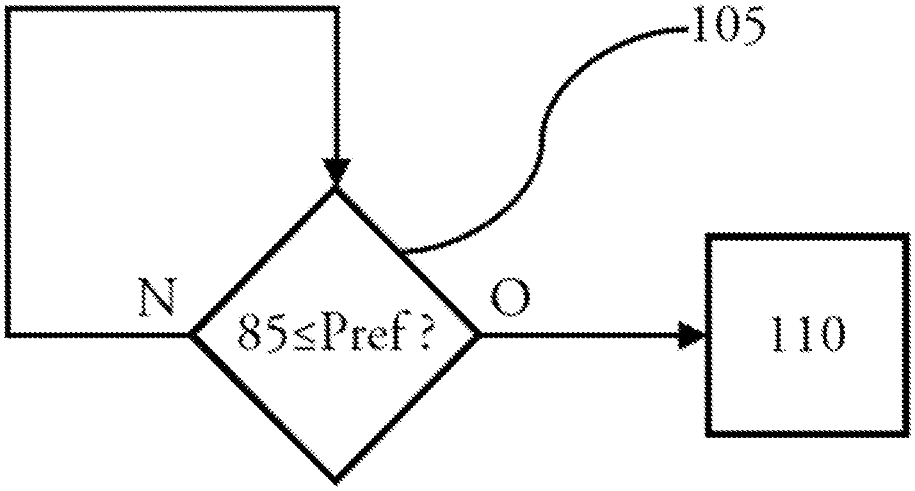

[fig 4]
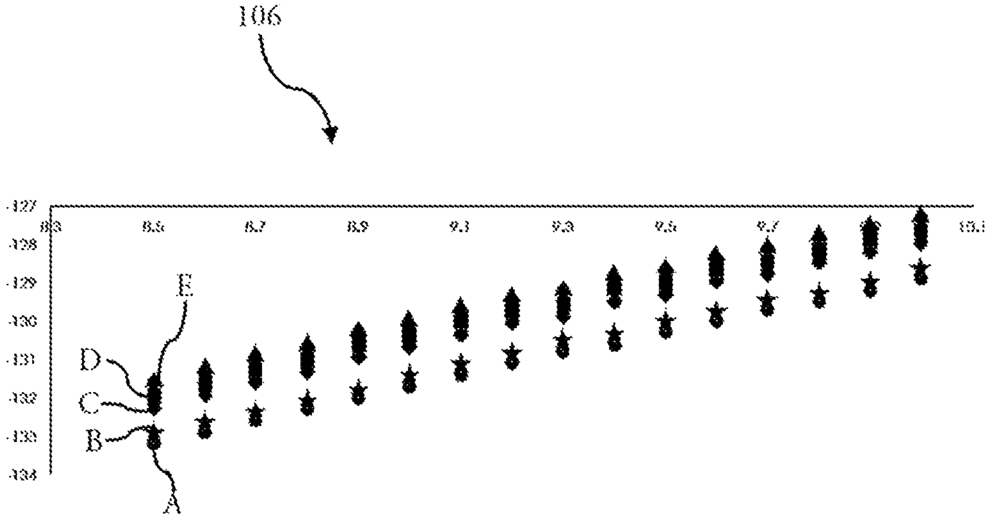
[fig 5]
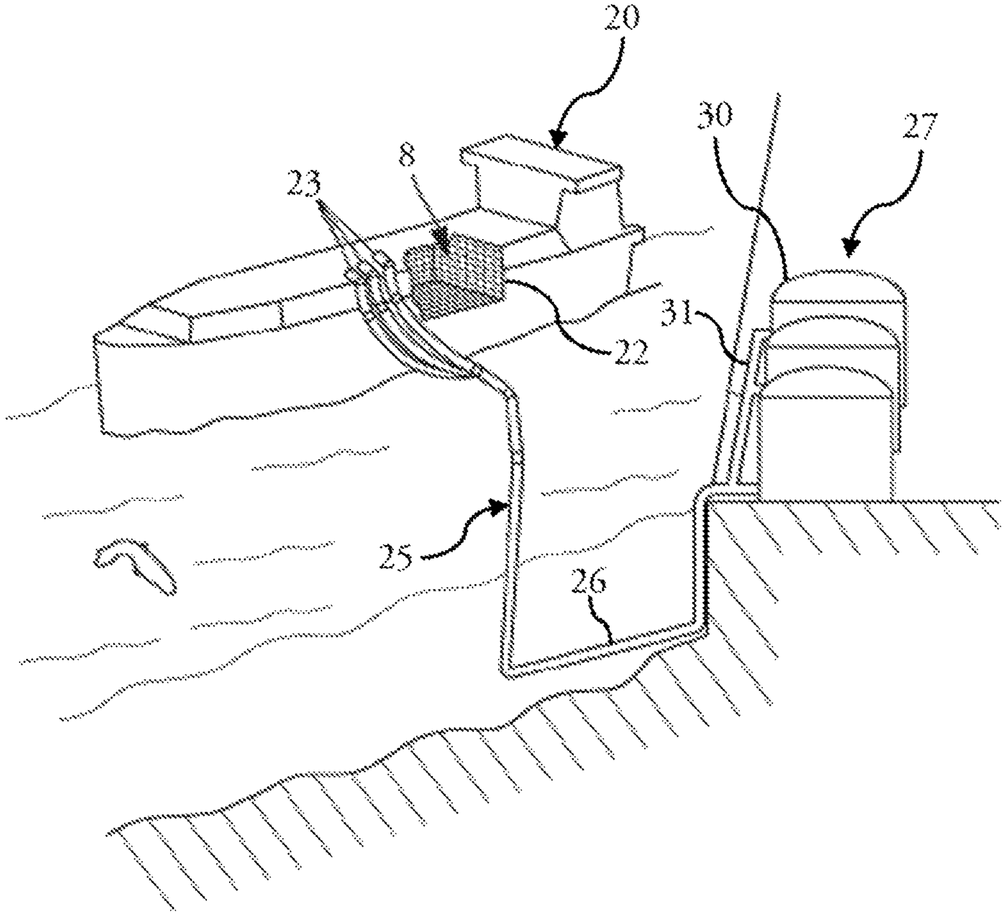

GAS SUPPLY SYSTEM FOR HIGH- AND LOW-PRESSURE GAS-CONSUMING APPARATUSES AND METHOD OF CONTROLLING SUCH A SYSTEM

CROSS-REFERENCE TO RELATED APPLICATION

The present application claims priority to French Patent Application No. 22 02941, filed on Mar. 31, 2022. The entire contents and disclosure of the priority application are incorporated herein by reference.

The present invention relates to the field of liquid-state gas storage and/or transport ships and relates more particularly to a gas supply system for consumer devices comprised within such ships, as well as a method for controlling such a system.

During a journey made by a ship comprising a tank of gas in the liquid state intended to be consumed and/or delivered to a destination point, said ship may be able to use at least a part of said gas in the liquid state in order to supply at least one of its engines, via a gas supply system. This is the case with ships provided with a high-pressure propulsion engine of the ME-GI type. In order to supply this type of engine, the gas must be compressed to very high pressure by special compressors capable of compressing the gas up to 300 bar absolute, but such compressors are expensive, giving rise to substantial maintenance costs and induce vibrations within the ship.

An alternative to the installation of these high-pressure compressors is to vaporize the gas in liquid form at 300 bar absolute, in particular using a high-pressure pump, before the gas is sent to the propulsion engine. Such a solution does not make it possible to eliminate the gas in vapor form (or BOG, which stands for "Boil-Off Gas") naturally forming within a tank at least partially containing the cargo, low-pressure compressors can be installed in order to supply an auxiliary engine, capable of consuming the gas in the form of a low-pressure vapor. The excess boil-off gas can circulate to the tank by being recondensed by the gas in the liquid state supplying the high-pressure gas-consuming apparatus.

However, this type of system has constraints to work within. Thus, the high-pressure pump can pump only gas in the liquid state, and might being damaged in the event that the gas passes into the vapor state. Care must therefore be taken to ensure that the gas in the liquid state does not evaporate during the heat exchange with the gas in the vapor state. However, the latter must be re-condensed in order to guarantee the effectiveness of the system.

The present invention aims to resolve such problems by proposing a gas supply system for at least one high-pressure gas-consuming apparatus and at least one low-pressure gas-consuming apparatus of a floating structure comprising at least one tank configured to contain the gas, the supply system comprising:

- at least one first circuit supplying gas to the high-pressure gas-consuming apparatus,
- at least one high-pressure evaporator configured to evaporate the gas circulating in the first gas supply circuit,
- at least one second circuit supplying gas to the low-pressure gas-consuming apparatus, comprising at least one compressor configured to compress gas taken in the vapor state into the tank to a pressure compatible with the requirements of the low-pressure gas-consuming apparatus,
- at least one gas return line connected to the second supply circuit downstream of the compressor and extending to the tank,
- at least one first heat exchanger and one second heat exchanger, each configured to exchange heat between the gas circulating in the return line in the vapor state and the gas circulating in the first supply circuit in the liquid state, the first supply circuit comprising a pump interposed between the first heat exchanger and the second heat exchanger, the return line comprising a flow-regulating member arranged between the first heat exchanger and the tank, characterized in that the supply system comprises a device for managing said supply system which comprises at least one first sensor and a first detector respectively configured to determine a temperature and pressure of the gas present in the first supply circuit between the first heat exchanger and the pump, a second sensor configured to determine a temperature of the gas present in the first supply circuit between the tank and the first heat exchanger, a third sensor configured to determine a temperature of the gas present in the return line between the first heat exchanger and the flow-regulating member, the management device comprising a control module configured to control the flow-regulating member according to the characteristics of the gas determined by the first sensor, the second sensor, the third sensor and the first detector.

The presence of this management device therefore makes it possible to regulate the gas circulating within the different parts of the supply system in order to maximize the condensation of the gas in the vapor state circulating in the return line, while avoiding premature evaporation of the gas in the liquid state circulating in the first supply circuit. The temperature and/or pressure of the gas is thus determined or measured at different locations of the supply system, thus making it possible to determine at which point it is possible to act on the regulating member and therefore to improve the performance of said supply system.

The first gas supply circuit makes it possible to meet the fuel needs of the high-pressure gas-consuming apparatus. By first circuit supplying gas to the high-pressure gas-consuming, it is understood that the first supply circuit is configured to supply gas to the high-pressure gas-consuming apparatus. Said apparatus may for example be the means for propelling the floating structure, for example an ME-GI engine. The first supply circuit extends from the tank to the high-pressure gas-consuming apparatus.

As the gas must be in the vapor state to be able to supply the high-pressure gas-consuming apparatus, the high pressure evaporator guarantees the boil-off of the gas before it is supplied to the high-pressure gas-consuming apparatus. The high-pressure evaporator is the site of the heat exchange between the gas in the liquid state circulating in the first supply circuit and a heat-transfer fluid, for example glycol water, seawater or water vapor. This heat transfer fluid, regardless of its shape, must be at a sufficiently high temperature to create a change of state of the gas so that it goes into the vapor or supercritical state and supplies the high-pressure gas-consuming apparatus.

Preferably, the second heat exchanger and the high-pressure evaporator form a single heat exchanger. Such a configuration may be advantageous, for example in order to reduce the mechanical bulk of the supply system. The gas in the liquid state, passing through the single heat exchanger, exchanges its calories with the gas in the vapor state circulating in the return line, and is also evaporated simultaneously or successively.

Alternatively, the second heat exchanger and the high-pressure evaporator can be two heat exchangers separate from one another.

The pump is interposed between the first heat exchanger and the second heat exchanger. It is the pump that makes it possible to increase the pressure of the gas in the liquid state circulating in the first supply circuit, so that it has a compatible pressure to supply the high-pressure gas-consuming apparatus. The optimal arrangement consists in placing the pump between the two heat exchangers. It is therefore essential to ensure that the gas circulating in the first supply circuit and passing through the first heat exchanger remains in the liquid state at the outlet thereof.

Generally, the gas contained in the tank can change naturally, or be forced by the floating structure, into the vapor state. The gas within the tank changing to the vapor state must be discharged in order to avoid creating overpressure within the tank.

Such a function is provided by the second gas supply circuit of the low-pressure gas-consuming apparatus. Such a second supply circuit extends from the tank to the low-pressure gas-consuming apparatus. The expression, second circuit supplying gas to the low-pressure gas-consuming, is understood to mean that the second supply circuit is configured to supply gas to the low-pressure gas-consuming apparatus. Said apparatus can for example be an auxiliary motor such as an electric generator. The compressor arranged on the second supply circuit is responsible for sucking the gas present in the space of the tank in order to be able both to power the gas-consuming apparatus at low pressure but also to regulate the pressure within the tank.

At the outlet of the compressor, the gas in the vapor state can supply the low-pressure gas-consuming apparatus, and/or circulate through the return line if the low-pressure gas-consuming apparatus does not require or has little fuel intake. Since the return line is connected downstream of the compressor, the gas in the vapor state drawn by the compressor can therefore circulate therein.

The gas in the vapor state circulating in the return line passes firstly through the second heat exchanger, then the first heat exchanger, before returning to the tank. According to this configuration, thanks to the exchange of calories occurring between the gas in the liquid state circulating in the first supply circuit and the gas in the vapor state circulating in the return line, the temperature of the gas in the vapor state decreases by passing through the two heat exchangers, until said gas condenses and returns to the liquid state substantially downstream of the first heat exchanger. The gas thus condensed, that is, in the liquid state, then circulates to the tank.

The return line comprises a flow-regulating member arranged downstream of the first heat exchanger. The flow-regulating member is able to open or close partially or completely, in order to control the flow rate of the gas circulating in the return line. The flow rate is controlled so that maximum gas in the vapor state is re-condensed. However, it is limited in order to avoid an evaporation of gas in the liquid state circulating in the first supply circuit during the heat exchange taking place in the first heat exchanger, which would generate cavitation of the pump.

The management device of the supply system makes it possible to control the flow-regulating member in particular according to the measurements made by the different sensors and detectors within said supply system and at different locations thereof. By definition, the sensors are configured to determine the temperature of the gas while the detectors are configured to determine the pressure of the gas.

The first sensor is positioned so as to determine or measure the temperature of the gas in the first supply circuit at the outlet of the first heat exchanger. Controlling this temperature contributes to determining whether the gas at the outlet of the first heat exchanger is kept in the liquid state, with the heat exchange occurring within the first heat exchanger increasing the gas temperature circulating in the first supply circuit. The temperature is also determined upstream of the pump, for example by immersing the first sensor in the gas at a location located between the outlet of the first heat exchanger and the inlet of the pump.

The first detector determines the pressure of the gas also circulating within the first supply circuit between the first heat exchanger and the pump. The determination of the pressure is also important since the boil-off temperature of the gas varies according to its pressure.

The second sensor is also positioned so as to determine the temperature of the gas circulating in the first supply circuit, but upstream of the first heat exchanger, unlike the first sensor. The third sensor is positioned so as to determine the temperature of the gas on the return line, downstream of the first heat exchanger and upstream of the flow-regulating member.

All the data from the sensors and the detector are transmitted to the control module. Depending on the data received, the control module is able to control the regulating member so as to maximize the quantity of condensed gas circulating in the return line, but without causing the boil-off of the gas in the liquid state circulating in the first supply circuit and passing through the first heat exchanger.

According to a feature of the invention, the supply system comprises a fluid analyzer configured to determine the composition of the gas in the liquid state contained in the tank. Several types of gas in the liquid state can be transported and/or stored within the tank mentioned above. All these gases have a different boil-off temperature depending on their respective composition, for example depending on the different types and proportions of hydrocarbons making up the gas and the evolution during transportation of the cargo. It is therefore important to know the composition of the gas cargo and therefore its boil-off temperature in order to optimally control the supply system of the invention.

The fluid analyzer can be able to determine the composition of the gas when in the liquid state. The gas in the liquid state can also be vaporized in a forced manner so that the fluid analyzer can determine the composition of the gas.

According to one feature of the invention, the management device comprises a second detector configured to determine a pressure of the gas present in the tank, the control module being configured to control the flow-regulating member according to the pressure of the gas determined by the second detector. This second detector determines the pressure of the gas circulating in the second supply circuit, this pressure being identical to the pressure of the gas in the tank space. In other words, the second detector helps to monitor the internal pressure of the tank. Such monitoring is important in order to avoid too low a pressure within the tank, which can cause the membranes of the tank to become deformed and damaged.

According to one feature of the invention, the return line comprises a flowmeter configured to determine the flow rate of gas in the vapor state circulating in the return line, the control module being configured to control the flow-regulating member according to the gas flow rate determined by the flowmeter. The flowmeter can be controlled by an operator in order to limit the flow rate of gas circulating in the return line. In this case, the flow-regulating member is controlled by the operator by means of the flowmeter and the control module, the latter ensuring the connection between the flowmeter and the flow-regulating member.

According to one feature of the invention, the first supply circuit comprises at least one pumping member configured to pump the gas taken from the liquid state in the tank. The pump, otherwise known as the pumping member, is installed at the bottom of the tank and ensures the pumping of the gas in the liquid state so that it can circulate in the first supply circuit. The pumping member is advantageously a submerged pump arranged at the bottom of the tank in order to draw the gas in the liquid state to circulate it within the first supply circuit. When the gas in the liquid state is pumped by the submerged pump, the pressure thereof is raised between 6 and 17 bar absolute.

The invention also relates to a method for controlling a supply system as described above, comprising:

- a step of comparing the temperature of the gas present in the first supply circuit between the first heat exchanger and the pump, and a maximum temperature threshold determined as a function of the pressure of the gas present in the first supply circuit between the first heat exchanger and the pump, a composition of the gas circulating in the supply system and a safety margin,
- if the temperature of the gas present in the first supply circuit between the first heat exchanger and the pump is greater than the maximum temperature threshold, a passage section of the flow-regulating member is reduced,
- if the temperature of the gas present in the first supply circuit between the first heat exchanger and the pump is lower than the maximum temperature threshold, a comparative step is implemented between the temperature of the gas present in the return line between the first heat exchanger and the flow-regulating member and an optimal temperature threshold determined according to the temperature of the gas present in the first supply circuit between the tank and the first heat exchanger and a temperature difference,
- if the temperature of the gas present in the return line between the first heat exchanger and the flow-regulating member is greater than the optimal temperature threshold, the passage section of the flow-regulating member is reduced,
- if the temperature of the gas present in the return line between the first heat exchanger and the flow-regulating member is lower than the optimal temperature threshold, the passage section of the flow-regulating member is increased.

It is by virtue of this control method that the regulation of the supply system is carried out in order to optimize the condensation of the gas in the vapor state without harming the good working order of the pump.

The comparison step makes it possible to ensure that the temperature of the gas circulating in the first supply circuit is not too high at the outlet of the first heat exchanger. To do this, the temperature of said gas is determined by the first sensor. At this stage, the temperature of the gas at the outlet of the first heat exchanger is then known.

In a simultaneous or successive manner, the maximum temperature threshold is determined. The objective is to maintain the temperature of the gas raised by the first sensor below this maximum temperature threshold. That threshold is calculated from the pressure of the gas determined by the first detector and the composition of the gas, which is known in one way or another. The safety margin is then subtracted from the result obtained. This safety margin makes it possible to ensure, for example, that the gas does not boil off even in the event that this maximum temperature threshold is slightly exceeded. Such a safety margin is dependent on the net positive suction height of the pump and a determined safety threshold. The net positive suction height is a piece of data to be monitored in order to prevent the suction of the gas in the liquid state at the inlet of the pump from causing the vaporization of said gas in the liquid state, which can create cavitation within the pump. The net positive suction height is dependent on the pump model used. The safety threshold can be determined by an operator and forms an additional security level in order to guarantee achievement of the objective.

Once the maximum temperature threshold and the temperature recorded by the first sensor are obtained, these two values are compared to each other during the comparison step.

If the temperature recorded by the first sensor is greater than the maximum temperature threshold, this means that the gas circulating in the first supply circuit leaves the first heat exchanger at an excessively high temperature. There is then a risk of partial evaporation, the vapor part of the gas leaving the first heat exchanger could damage the operation of the pump.

Too high a temperature at the first supply circuit at the outlet of the first heat exchanger is synonymous with an excessive heat exchange within the first heat exchanger. It is possible to reduce the level of this heat exchange by limiting the flow rate of gas in the vapor state circulating in the return line. The control module then controls the flow-regulating member in order to reduce the flow rate of gas in the vapor state circulating within the return line.

By virtue of this reduction in flow rate, the exchange of heat produced in the first heat exchanger is smaller and the gas circulating in the first supply circuit leaves the first heat exchanger at a lower temperature and is therefore kept in the liquid state.

If the temperature of the gas determined by the first sensor is lower than the maximum temperature threshold, then the method continues with the comparative step. At this stage, it is ensured that, under the conditions of the supply system at the instant t, there is no risk of evaporation of the gas in the liquid state at the outlet of the first heat exchanger. It is therefore possible to potentially increase the flow rate of gas in the vapor state circulating in the return line in order to maximize the quantity of gas condensed by the supply system.

To do this, the comparative step consists initially in determining the temperature of the gas present in the return line between the first heat exchanger and the flow-regulating member via the third sensor, and, simultaneously or successively, determining the optimal temperature threshold.

The optimal temperature threshold corresponds to the temperature determined by the second sensor, that is, the temperature of the gas circulating within the first supply circuit and measured between the tank and the first heat exchanger, preferably at the inlet of the first heat exchanger, to which the temperature difference is added. The temperature difference corresponds for example to the pinching of the first heat exchanger. The temperature of the gas determined by the third sensor is then compared with the optimum temperature threshold.

The objective here is to maximize the efficiency of the condensation performed by the supply system. This maximization is possible by making the temperature determined by the third sensor converge on the optimal temperature threshold. Thus, if the temperature determined by the third sensor is lower than the optimal temperature threshold, this means that it is possible to condense a larger quantity of gas in the vapor state circulating in the return line. The control module then increases the passage section of the flow-regulating member in order to increase the quantity of gas circulating in the return line, until the temperature of the gas determined by the third sensor is made to converge with the optimal temperature threshold.

If the temperature determined by the third sensor is greater than the optimal temperature threshold, this means that the condensation of the gas in the vapor state present in the return line is not optimal. The control module then decreases the passage section of the flow-regulating member in order to reduce the quantity of gas circulating in the return line, until the temperature of the gas determined by the third sensor is made to converge with the optimal temperature threshold. Since the optimal temperature threshold is dependent on a measured temperature, this threshold varies according to the conditions of use of the supply system.

As has been described, the comparative step follows the comparison step. However, it is possible for the control method to implement the comparison step and the comparative step simultaneously. The potential adjustment of the passage section of the flow-regulating member is then carried out according to the priority step, that is, the comparison step or the comparative step if it has been determined in the comparison step that the passage section of the flow-regulating member does not need to be reduced.

According to one feature of the method, the method may be repeated over time. The method is repeatable from the comparison step if the steps are successive, or from the comparison step and from the comparative step if they are implemented simultaneously. The method can be repeated once the control of the passage section of the regulating member according to the comparison step or the comparative step is carried out.

According to one feature of the method, the composition of the gas can be determined by the fluid analyzer. The determination of the composition of the gas is available at least when the step of comparison of the control method is being implemented, and makes it possible to define the maximum temperature threshold. The fluid analyzer mentioned above constitutes a solution for obtaining the composition of the gas and this analysis can be carried out when loading the cargo, or subsequently, that is, to say during the movement of the floating structure.

According to one feature of the method, the composition of the gas can be determined by means of technical documentation. This is an alternative solution to determining via the fluid analyzer, for example in the case where the supply system does not comprise such a fluid analyzer. Technical documentation is provided with the cargo and contains a plurality of features relating thereto, such as the boil-off temperature of the gas of the cargo. This technical documentation is for example a chart matching the boil-off temperature to the specific pressure of the gas contained in the cargo.

According to one feature of the method, the maximum temperature threshold can be determined by virtue of a data table of several types of gas. In the absence of a gas analyzer and technical documentation, it is possible to rely on a data table. Such a table has the boil-off temperature as a function of pressure for a majority of the types of natural gas transported and/or stored by a ship and known to date. Thus, by raising the pressure determined by the first detector, the lowest boil-off temperature among the different types of gas at the determined pressure is used to set the maximum temperature threshold, while also taking into account the safety margin. Such a data table can be read manually or entered into a memory of the management device to automate the determination of the maximum temperature threshold.

According to a feature of the method, the safety margin and the temperature difference correspond to a value between 1° C. and 3° C. These are sufficient values while being relatively close to the actual temperature limit values, in order not to harm the optimization of the operation of the supply system.

According to a feature of the method, the pressure of the gas determined by the second detector is compared with a pressure threshold. This determination is done in parallel with the steps described above. The second detector makes it possible to determine the pressure of the gas circulating in the second supply circuit, and therefore the pressure that prevails in the tank space. This determination makes it possible to ensure that the internal pressure of the tank is not too low. An internal tank pressure that is too low may lead to a deformation of the membranes. The internal pressure of the tank must therefore be kept above the pressure threshold. The pressure threshold corresponds to a fixed value below which it is assumed that the internal pressure of the tank can cause a deformation of the membranes of said tank. By way of examples, the pressure threshold may be −60 mbars or −30 mbars relative to the external pressure.

According to one feature of the method, the method comprises a step of interrupting the gas flow within the return line when the pressure of the gas determined by the second detector is lower than the pressure threshold. The circulation of gas within the second supply circuit and the return line is the result of the suction of the gas in the vapor state in the space of the tank, and leads to a reduction in the internal pressure of the tank. Thus, when the pressure of the tank space is below the pressure threshold, the membrane of the tank risks being damaged. The control member then completely closes the flow-regulating member in order to stop the reduction in pressure.

Other features and advantages of the invention will appear both from the description which follows and from several exemplary embodiments, which are given for illustrative purposes and without limitation with reference to the appended schematic drawings, in which:

FIG. 1 is a schematic representation of a supply system according to the invention, FIG. 2 is a flowchart of a control method according to the invention, of the supply system, FIG. 3 is a flowchart of a part of the control method monitoring an amount of gas in the vapor state, FIG. 4 is an example of a data table of several types of gas, usable for the implementation of the control method, FIG. 5 is a cut-away schematic illustration of a tank of a floating structure and of a terminal for loading and/or unloading this tank.

The terms "upstream" and "downstream" employed in the following description are used to express positions of elements within gas circuits in the liquid state or in the vapor state and refer to the direction of circulation of said gas within said circuit.

FIG. 1 shows a gas supply system 1 arranged on a floating structure. The supply system 1 makes it possible to circulate gas that can be in the liquid state, in the vapor state, in the two-phase state or in the supercritical state, from a storage and/or transport tank 8, to a high-pressure gas-consuming apparatus 4 and to a low-pressure gas-consuming apparatus 5, in order to supply the latter with fuel.

Said floating structure may for example be a ship that can store and/or transport gas in the liquid state, in particular natural gas. In this case, the supply system 1 is capable of using the gas in the liquid state that the floating structure stores and/or transports to supply the high-pressure gas-consuming apparatus 4, which may for example be a propulsion engine, and the low-pressure gas-consuming apparatus 5, which may for example be an electric generator supplying the floating structure with electricity.

In order to ensure the circulation of the gas contained in the tank 8 to the high-pressure gas-consuming apparatus 4, the supply system 1 is provided with a first gas supply circuit 2. The first supply circuit 2 comprises a pumping member 9, advantageously a submerged pump 9 arranged within the tank 8. The submerged pump 9 makes it possible to pump the gas in the liquid state and to circulate it in particular within the first supply circuit 2. By drawing the gas in the liquid state, the pumping member 9 raises the pressure thereof to a value of between 6 and 17 bar absolute.

The gas in the liquid state, in a direction of circulation from the tank 8 to the high-pressure gas-consuming apparatus 4, passes through a first heat exchanger 6 and is pressurized by a pump 10. Subsequently, the gas in the liquid state passes through a single heat exchanger 21, combining a second heat exchanger 7 and a high-pressure evaporator 11. However, it is possible for the second heat exchanger 7 and the high-pressure evaporator 11 to be distinct from one another. The details concerning heat exchangers will be described below.

The single heat exchanger 21, via the high-pressure evaporator 11, makes it possible to modify the state of the gas circulating in the first supply circuit 2 in order to change it to the vapor or supercritical state. Such a state allows the gas to be compatible to supply the high-pressure gas-consuming apparatus 4. The evaporation of the gas in the liquid state can for example be carried out by heat exchange with a heat transfer fluid at a temperature high enough to evaporate the gas in the liquid state, in this case glycol water, seawater or water vapor.

The increase in gas pressure is ensured by the pump 10 when the latter pumps the gas in the liquid state. The pump 10 makes it possible to raise the pressure of the gas in the liquid state to a value of between 30 and 400 bar absolute, in particular for use with ammonia or hydrogen, between 30 and 70 bar absolute for use with liquefied petroleum gas, and preferably between 150 and 400 bar absolute for use with ethane, ethylene or else liquefied natural gas consisting mainly of methane.

By virtue of the combination of the pump 10 and the single heat exchanger 21, the gas is at a pressure and in a compatible state for the supply of the high-pressure consuming apparatus 4. Such a configuration makes it possible to avoid the installation of high-pressure compressors on the first supply circuit 2 which have cost constraints and generate strong vibrations.

Within the tank 8, a part of the gas cargo can naturally change to the vapor state and diffuse into a space of the tank 12. In order to avoid overpressure within the tank 8, the gas in the vapor state contained in the tank space 12 must be discharged.

The supply system 1 therefore comprises a second gas supply circuit 3, which uses the gas in the vapor state to supply the low-pressure gas-consuming apparatus 5. The second supply circuit 3 extends between the tank space 12 and the low-pressure gas-consuming apparatus 5. In order to suck the gas in the vapor state contained in the tank space 12, the second supply circuit 3 comprises a compressor 13. In addition to sucking the gas in the vapor state, the compressor 13 also makes it possible to compress the gas in the vapor state circulating in the second supply circuit 3 to a pressure of between 6 and 20 bar absolute, so that the gas in the vapor state is at a compatible pressure for the supply of the low-pressure gas-consuming apparatus 5. The second supply circuit 3 thus makes it possible to supply the low-pressure gas-consuming apparatus 5, while regulating the pressure within the tank 8 by sucking the gas in the vapor state present in the tank space 12.

The presence of the gas in the vapor state in excess quantity within the tank space 12 causes an overpressure within the tank 8. It is therefore necessary to evacuate the gas in the vapor state in order to lower the pressure within the tank 8. The excess gas in the vapor state can then for example be eliminated by a burner 18 or, in a manner not shown, discharged into the atmosphere and thus generate a loss of cargo. However, the supply system 1 according to the invention comprises a return line 14 which extends from the second supply circuit 3 to the tank 8.

The return line 14 is connected to the second supply circuit 3 downstream of the compressor 13 relative to a direction of circulation of the gas in the vapor state circulating in the second supply circuit 3. The return line 14 passes through the single heat exchanger 21 in a first step. As such, the single heat exchanger 21 therefore comprises a first pass 24 within which the gas in the liquid state circulates from the first supply circuit 2, a second pass 28 within which the gas in the vapor state circulates from the return line 14 and a third pass 29 within which the heat transfer fluid circulates evaporating the gas in the liquid state circulating in the first pass 24.

At the outlet of the second pass 28 of the single heat exchanger 21, the gas in the vapor state circulates until it passes through the first heat exchanger 6. The inlet of the first heat exchanger 6 is where the gas in the liquid state of the first supply circuit 2 has the lowest temperature. Consequently, it is therefore after having passed through the first heat exchanger 6 that the gas circulating in the return line 14 is condensed. The gas from the return line 14 is therefore in the vapor state at the inlet of the first heat exchanger 6 and exits in the liquid state following the exchange of calories taking place within the first heat exchanger 6.

The return line 14 also comprises a flow-regulating member 15 which controls the flow rate of the fluid circulating in the return line 14. This flow-regulating member 15 has a passage section that can be modified. Once the gas is condensed, it circulates to the tank 8. The first heat exchanger 6 therefore acts as a condenser, while the flow-regulating member 15 controls the heat exchange that takes place in the first heat exchanger 6 and in the single heat exchanger 21.

The supply system 1 further comprises an auxiliary supply line 16, extending from the first supply circuit 2, via a tap arranged between the pumping member 9 and the first heat exchanger 6, to the second supply circuit 3, connecting thereto between the compressor 13 and the low-pressure gas-consuming apparatus 5. The auxiliary supply line 16 makes it possible to power the low-pressure gas-consuming apparatus 5 in the event of insufficient flow of gas in the vapor state formed within the tank space 12.

When the gas in the vapor state is not present in sufficient quantity in the tank space 12, the liquid gas pumped by the submerged pump 9 can then circulate within this auxiliary supply line 16 in order to supply the low-pressure gas-consuming apparatus 5. To do this, the auxiliary supply line 16 passes through a low-pressure evaporator 17 so that the gas in the liquid state circulating in the auxiliary supply line 16 passes to the vapor state. The operation of the low pressure evaporator 17 can for example be identical to that of the high-pressure evaporator 11, that is, the gas is evaporated by heat exchange with a heat transfer fluid at a temperature high enough to boil off the gas in the liquid state. At the outlet of the low pressure evaporator 17, the gas in the vapor state circulates within the auxiliary supply line 16, then joins the second supply circuit 3 in order to supply the low-pressure gas-consuming apparatus 5.

It is understood from the foregoing that the auxiliary supply line 16 is used only when there is not enough gas in the vapor state within the tank space 12. Thus, the auxiliary supply line 16 comprises a valve 19 controlling the flow of gas within the auxiliary supply line 16 when the use thereof is not necessary.

The pump 10 is advantageously arranged between the first heat exchanger 6 and the single heat exchanger 21. The pump 10 is only capable of pumping gas in the liquid state. In order not to harm its correct operation, it is important that the gas circulating in the first supply circuit 2 is kept in the liquid state in the outlet of the first heat exchanger 6.

Furthermore, one of the objectives of the supply system 1 according to the invention is to re-condense a maximum gas in the vapor state formed in the tank space 12 and not consumed by the low-pressure gas-consuming apparatus 5, but without causing the boil-off of the gas circulating in the first supply circuit 2 when the first heat exchanger 6 is passed through.

To do this, the supply system 1 comprises a management device 80 ensuring the control of the different parameters mentioned above. The management device 80 notably comprises a first sensor 81, a second sensor 82, a third sensor 83, a first detector 84 and a second detector 85. It will subsequently be considered that the sensors 81, 82, 83 determine a temperature of the gas, while the detectors 84, 85 determine a pressure of the gas. The management device 80 also comprises a control module 86 receiving the different data determined by the sensors 81, 82, 83 as well as by the detectors 84, 85. In response to these said data, the control module 86 can act on the flow-regulating member 15 in order to vary the flow rate of gas circulating in the return line 14.

The first sensor 81 is positioned at the first supply circuit 2 between the first heat exchanger 6 and the pump 10. The second sensor 82 is positioned at the first supply circuit 2 between the tank 8 and the first heat exchanger 6. The third sensor 83 is positioned at the return line 14 between the first heat exchanger 6 and the flow-regulating member 15. Each of the sensors 81, 82, 83 is configured to determine the temperature of the gas circulating at each respective position of said sensors 81, 82, 83. The temperature of the gas circulating in these different sections of the supply system 1 is used to control the flow-regulating member 15. The same applies for the pressures determined by the first detector 84, positioned at the first supply circuit 2 between the first heat exchanger 6 and the pump 10, and for the second detector 85, positioned at the second supply circuit 3 between the tank 8 and the compressor 13.

The management device 80 can also comprise a fluid analyzer 87 able to determine the composition of the gas in the liquid state contained in the tank 8. The fluid analyzer 87 can determine the composition of the gas directly in the liquid state or may require the gas to be vaporized in order to determine the composition thereof. Knowledge of the gas composition is advantageous for determining an boil-off temperature of the gas as will be described in detail below.

Like the temperature and pressure values, the composition of the gas determined by the fluid analyzer 87 is also transmitted to the control module 86. The composition of the gas may however also be given via technical documentation relating to the gas cargo or correspond to a type of gas, the characteristics of which are mentioned within a data table, as will be shown below.

The return line 14 may also comprise a flowmeter 88. The flowmeter is configured to determine the gas flow rate circulating in the return line 14. Advantageously, the gas flow rate is determined between the connection with the second supply circuit 3 and the single heat exchanger 21. The flowmeter 88 is also connected to the control module 86 which can act on the flow-regulating member 15. As such, an operator can act on the flowmeter 88 so that the control member 86 receives the information from the flow meter 88 and acts on the flow-regulating member 15 in response to this information from the flow meter 88.

FIG. 2 is a flowchart making it possible to describe the various steps of a control method 100 according to the invention, for example when it is implemented by the management device described above.

The control method 100 begins with a comparison step 101 between the temperature of the gas by the first sensor 81 and a maximum temperature threshold Tmax. The temperature of the gas determined by the first sensor 81 corresponds to the temperature of the gas circulating in the first supply circuit at the outlet of the first heat exchanger. It may in particular be a measurement in-situ, by positioning the first sensor 81 at any location located between an outlet of the pass of the first heat exchanger forming part of the first supply circuit and an inlet of the pump, as shown in FIG. 1. It may also be an estimate or a calculation made from other data of the system.

Before, simultaneously or successively, determining the temperature of the gas by the first sensor 81, the maximum temperature threshold Tmax is defined from the pressure of the gas determined by the first detector, the composition of the gas, and a safety margin. The pressure of the gas used during the determination of the maximum temperature threshold Tmax corresponds to the pressure of the gas circulating in the first supply circuit, at the outlet of the first heat exchanger.

As for the first sensor 81, the first detector can measure the pressure in-situ or result from an estimate or a calculation made from other data of the system.

It is possible to find the boil-off temperature of the gas if its pressure and composition are known. The pressure is determined by the first detector 84, while the composition of the gas can be obtained by virtue of the fluid analyzer 87 shown in FIG. 1. If the supply system does not include a fluid analyzer, the gas composition may be given by the technical documentation of the cargo, in particular communicated at the time of loading the cargo. If neither one nor the other are available, the maximum temperature threshold Tmax can be determined using a data table, shown in FIG. 4, grouping together the different types of gas and having the different boil-off temperatures depending on the pressure of each of the gases. Since the pressure determined by the first detector 84 is known, the data table is therefore read from this pressure by choosing the lowest boil-off temperature in order to ensure that, regardless of the type of gas contained in the tank, that gas has at least this selected temperature as the boil-off temperature.

The maximum temperature threshold Tmax is finally obtained by subtracting the safety margin from the boil-off temperature of the gas obtained previously. The safety margin depends on the net positive suction height of the pump and a safety threshold. The net positive suction height is specific to the pump used within the first supply circuit and corresponds to a limit at which point the pump risks boiling off the gas in the liquid state by pumping it. The security threshold can be selected by the operator. The safety margin may for example be between 1° C. and 3° C. in order to obtain a maximum temperature threshold Tmax slightly lower than the actual boil-off temperature of the gas.

Once the maximum temperature threshold has been obtained, the comparison between the latter and the temperature of the gas determined by the first sensor 81 can be implemented.

If the temperature of the gas determined by the first sensor 81 is greater than the maximum temperature threshold, this means that the gas circulating in the first supply circuit leaves the first heat exchanger at an excessively high temperature, thus risking boiling off at least partially and damaging the pump as a result.

Too high a gas temperature between the first heat exchanger and the pump means that the heat exchange occurring within the first heat exchanger is too great. In order to reduce this heat exchange, the flow rate of gas circulating in the return line must therefore be reduced.

Thus, when the temperature of the gas determined by the first sensor 81 is greater than the maximum temperature threshold, the control method 100 continues with a step of reducing 103 the passage section. During this reduction step 103, the control module described in FIG. 1 acts on the flow-regulating member 15, and decreases its passage section in order to reduce the flow rate of gas circulating in the return line, thus limiting the heat exchange within the first heat exchanger and therefore the rise in temperature of the gas circulating in the first supply circuit. This thus prevents the boil-off of the gas upstream of the pump.

Once the reduction step 103 has been completed, the control method 100 can be repeated from the comparison step 101, for example in order to verify that the temperature of the gas circulating between the first heat exchanger and the pump has indeed decreased.

If the temperature of the gas determined by the first sensor 81 is below the maximum temperature threshold Tmax, the control method 100 continues with a comparative step 102.

The comparative step 102 is done between the temperature of the gas by the third sensor 83, that is, the gas circulating in the return line, after having passed through the first heat exchanger, and an optimal temperature threshold Topt, corresponding to the temperature of the gas determined by the second sensor, that is, the gas circulating in the first supply circuit, upstream of the first heat exchanger, to which a temperature difference is added. That difference, just like for the safety margin, may be between +1° C. and +3° C. This temperature difference is the minimum difference between the temperature of the gas in the liquid state corning from the tank and which enters the first heat exchanger 6, for example measured by the second sensor 82, and the temperature of the gas circulating in the return line 14 measured at the outlet of the first heat exchanger 6, for example measured by the third sensor 83. This temperature difference may correspond to the pinching of the first heat exchanger 6.

The second sensor and the third sensor 83 can measure the temperature in-situ, that is, at the positions described above, or result from an estimate or a calculation made from other data of the system.

The comparative step 102 makes it possible to optimize the condensation of the gas circulating in the return line. The objective is to make the value of the temperature of the gas circulating in the return line at the outlet of the first heat exchanger converge to the optimal temperature threshold Topt in order to perform optimum condensation and in maximum quantity. If the gas circulating in the return line leaves the first heat exchanger has too high a temperature, this means that the gas circulates in too great a quantity in order to be condensed effectively. Conversely, if the gas circulating in the return line leaves the first heat exchanger has too low a temperature, this means that the gas flow rate can be increased in order to condense a greater quantity of gas in a given time.

The temperature of the gas determined by the third sensor 83 is then compared with the optimum temperature threshold Topt. Whether the temperature of the gas determined by the third sensor 83 is greater than or lower than the optimal temperature threshold Topt, the control method 100 continues with a step in which the control module adjusts the passage section of the flow-regulating member. More specifically, the control method 100 continues with the step 103 of reducing the passage section of the flow-regulating member if the temperature of the gas determined by the third sensor 83 is greater than the optimal temperature threshold Topt. This reduction step 103 is similar to that which can result from the comparison step 101. Conversely, the control method 100 continues with the step 104 of reducing the passage section of the flow-regulating member if the temperature of the gas determined by the third sensor 83 is greater than the optimal temperature threshold Topt.

It should be noted that in FIG. 2, the comparison step 101 and the comparative step 102 are carried out one after the other, the comparison step 101 being carried out first. The control method 100 may however be configured so as to implement the comparison step 101 and the comparative step 102 simultaneously, the comparison step 101 nevertheless taking priority over the comparative step 102.

Once the reduction step 103 or the increase step 104 is performed according to the comparison step 101 or the comparative step 102, the control method 100 can be reiterated from the comparison step 101 if the steps are successive, or from the two simultaneous steps such as has been described previously. The priority is to ensure that the liquid gas circulating in the first supply circuit does not exit at least partially evaporated. The comparison step 101 therefore has priority on the condensation optimization operation of the gas in the vapor state circulating in the return line, corresponding to the comparative step 102.

FIG. 3 is a flowchart of a part of the control method monitoring an internal pressure of the tank space. This part of the control method takes place in parallel with what has been described in FIG. 2, and consists in particular of a monitoring step 105 where the determined pressure of the tank space is compared with a pressure threshold Pref. The pressure threshold Pref may for example correspond to a value of −30 mbars or −60 mbars relative to the external pressure. It is the second detector 85 which determines, for example, the pressure of the gas circulating in the second supply circuit between the tank and the compressor, and generally the internal pressure of the tank space.

This pressure determined by the second detector 85 is then compared with the pressure threshold Pref. Said threshold is fixed and corresponds to a pressure value below which there is a risk of damaging the walls of the tank.

Thus, if the pressure determined by the second detector 85 is lower than or equal to the pressure threshold Pref, this means that there is a risk of damaging the walls of the tank if the pressure of the tank space decreases further. A step of interruption 110 is implemented, where the control module entirely closes the flow-regulating member. In such a situation, the supply system can be deployed while waiting for the pressure in the tank space to increase. Alternatively, the low-pressure gas-consuming apparatus can be powered by means of the auxiliary supply line 16 shown in FIG. 1.

If the pressure determined by the second detector 85 is greater than the pressure threshold, the control method can proceed while continuing to monitor the value of the pressure determined by the second detector 85.

FIG. 4 shows the data table 106 mentioned above making it possible to determine the maximum temperature threshold Tmax mentioned in FIG. 2. This data table 106 represents the boil-off temperature as a function of the pressure determined by the first detector for five different types of gas A, B, C, D and E.

Thus, if the composition of the gas contained in the tank cannot be known, the data table 106 is used to determine a theoretical boil-off temperature as a function of the pressure determined by the first detector. In order to ensure that the gas contained in the tank is maintained in the liquid state within the first supply circuit at the outlet of the first heat exchanger, rather than the composition of said gas, the chosen boil-off temperature is as low as possible. In FIG. 4, it is therefore the first type of gas A that is chosen. Once the safety margin is applied, the maximum temperature threshold is then determined.

FIG. 5 is a cutaway view of a floating structure 20 which shows the tank 8 which contains the gas in the liquid state and in the vapor state, this tank 8 having a generally prismatic shape mounted in a double hull 22 of the floating structure 20. The wall of the tank 8 comprises a primary sealing membrane intended to be in contact with the gas in the liquid state contained in the tank 8, a secondary sealing membrane arranged between the primary sealing membrane and the double hull 22 of the floating structure 20, and two thermally insulating barriers respectively arranged between the primary sealing membrane and the secondary sealing membrane and between the secondary sealing membrane and the double hull 22.

Pipes 23 for loading and/or unloading gas in the liquid state, arranged on the upper deck of the floating structure 20, can be connected, by means of suitable connectors, to a marine or port terminal to transfer the cargo of gas in the liquid state from or to the tank 8.

FIG. 5 also shows an example of a maritime terminal comprising a port or shipping terminal loading and/or unloading station 25, an underwater duct 26 and an onshore and/or port facility 27. The onshore and/or port facility 27 can for example be arranged on the dock of a port, or according to another example be arranged on a concrete gravity platform. The onshore and/or port facility 27 comprises storage tanks 30 for gas in the liquid state, and connecting pipes 31 that are connected by the underwater pipe 26 to the loading and unloading equipment 25.

To generate the pressure necessary for the transfer of the gas in the liquid state, pumps equipping the onshore and/or port facility 27 and/or pumps equipping the floating structure 20 are implemented.

Of course, the invention is not limited to the examples that have just been described, and numerous modifications can be made to these examples without departing from the scope of the invention.

The invention, as has just been described, clearly achieves its intended goal, and makes it possible to propose a gas supply system comprising a management device ensuring the control of the temperature and the condensation of said gas. Variants not described here could be implemented without departing from the context of the invention, since, in accordance with the invention, they comprise a supply system according to the invention.

The invention claimed is:

1. A system for supplying gas to at least one high-pressure gas-consuming apparatus and at least one low-pressure gas-consuming apparatus of a floating structure comprising at least one tank configured to contain the gas, the supply system comprising:

at least one first circuit supplying gas to the high-pressure gas-consuming apparatus, at least one high-pressure evaporator configured to evaporate the gas circulating in the first gas supply circuit, at least one second circuit supplying gas to the low-pressure gas-consuming apparatus, comprising at least one compressor configured to compress gas taken in a vapor state into the tank to a pressure compatible with the requirements of the low-pressure gas-consuming apparatus, at least one gas return line connected to the second supply circuit downstream of the compressor and extending to the tank, at least one first heat exchanger and one second heat exchanger, each configured to exchange heat between the gas circulating in the return line in the vapor state and the gas circulating in the first supply circuit in a liquid state, the first supply circuit comprising a pump interposed between the first heat exchanger and the second heat exchanger, the return line comprising a flow-regulating member arranged between the first heat exchanger and the tank, and a management device configured to manage said supply system, said management device comprising at least one first sensor and a first detector respectively configured to determine a temperature and pressure of the gas present in the first supply circuit between the first heat exchanger and the pump, a second sensor configured to determine a temperature of the gas present in the first supply circuit between the tank and the first heat exchanger, a third sensor configured to determine a temperature of the gas present in the return line between the first heat exchanger and the flow-regulating member, the management device comprising a control module configured to control the flow-regulating member according to the characteristics of the gas determined by the first sensor, the second sensor, the third sensor and the first detector.

2. The supply system according to claim 1, further comprising a fluid analyzer configured to determine a composition of the gas in the liquid state contained in the tank.

3. The supply system according to claim 1, wherein the management device comprises a second detector configured to determine a pressure of the gas present in the tank, the control module being configured to control the flow-regulating member according to the pressure of the gas determined by the second detector.

4. The supply system according to claim 1, wherein the return line comprises a flowmeter configured to determine the flow rate of gas in the vapor state circulating in the return line, the control module being configured to control the flow-regulating member according to the gas flow rate determined by the flowmeter.

5. The supply system according to claim 1, wherein the first supply circuit comprises at least one pumping member configured to pump the gas taken from the liquid state in the tank.

6. A method for controlling the supply system according to claim 1, comprising:

comparing the temperature of the gas present in the first supply circuit between the first heat exchanger and the pump, and a maximum temperature threshold determined as a function of the pressure of the gas present in the first supply circuit between the first heat exchanger and the pump, a composition of the gas circulating in the supply system and a safety margin, reducing, when the temperature of the gas present in the first supply circuit between the first heat exchanger and the pump is greater than the maximum temperature threshold, a passage section of the flow-regulating member, implementing, when the temperature of the gas present in the first supply circuit between the first heat exchanger and the pump is lower than the maximum temperature threshold, a comparison between the temperature of the gas present in the return line between the first heat exchanger and the flow-regulating member and an optimal temperature threshold determined according to the temperature of the gas present in the first supply circuit between the tank and the first heat exchanger and a temperature difference, reducing, when the temperature of the gas present in the return line between the first heat exchanger and the flow-regulating member is greater than the optimal temperature threshold, the passage section of the flow-regulating member, increasing, when the temperature of the gas present in the return line between the first heat exchanger and the flow-regulating member is lower than the optimal temperature threshold, the passage section of the flow-regulating member.

7. The control method according to claim 6, wherein the control method is repeated over time.

8. The control method according to claim 6, wherein the supply system further comprises a fluid analyzer configured to determine a composition of the gas in the liquid state contained in the tank, and the composition of the gas is determined by the fluid analyzer.

9. The control method according to claim 6, wherein the composition of the gas is determined by technical documentation.

10. The control method according to claim 6, wherein the maximum temperature threshold is determined by virtue of a data table of several types of gas.

11. The control method according to claim 6, wherein the safety margin and the temperature difference correspond to a value between 1° C. and 3° C.

12. The control method according to claim 6, wherein the management device comprises a second detector configured to determine a pressure of the gas present in the tank, the control module being configured to control the flow-regulating member according to the pressure of the gas determined by the second detector, and the pressure of the gas determined by the second detector is compared to a pressure threshold.

13. The control method according to claim 12, further comprising interrupting the gas flow within the return line when the pressure of the gas determined by the second detector is lower than the pressure threshold.

* * * * *